(12) United States Patent
Squires

(10) Patent No.: US 8,377,176 B1
(45) Date of Patent: Feb. 19, 2013

(54) METHOD AND APPARATUS FOR LONGITUDINALLY DISPOSED, SHARP PUFF OF GAS

(75) Inventor: Arthur M. Squires, Blacksburg, VA (US)

(73) Assignee: Arthur M. Squires Irrevocable Trust, Blacksburg, VA (US)

( * ) Notice: Subject to any disclaimer, the term of this patent is extended or adjusted under 35 U.S.C. 154(b) by 359 days.

(21) Appl. No.: 12/799,857

(22) Filed: May 3, 2010

Related U.S. Application Data

(60) Provisional application No. 61/215,075, filed on May 1, 2009.

(51) Int. Cl.
 *B01D 46/30* (2006.01)
(52) U.S. Cl. ............... 95/276; 95/107; 95/280; 55/282; 55/302; 55/474; 96/150
(58) Field of Classification Search ........... 55/302, 55/303, 474, 282; 95/276, 279, 280, 107; 96/150
See application file for complete search history.

(56) References Cited

U.S. PATENT DOCUMENTS

| | | | | |
|---|---|---|---|---|
| 3,800,508 A * | 4/1974 | Zenz | ................... | 95/276 |
| 3,912,466 A * | 10/1975 | Zenz | ................... | 95/276 |
| 3,926,587 A * | 12/1975 | Squires | ................... | 95/74 |
| 3,926,593 A * | 12/1975 | Squires et al. | ................... | 95/276 |
| 3,928,532 A * | 12/1975 | Squires | ................... | 423/210 |
| 3,957,953 A * | 5/1976 | Squires | ................... | 423/244.02 |
| 3,981,355 A * | 9/1976 | Squires | ................... | 165/104.16 |
| 3,982,326 A * | 9/1976 | Squires | ................... | 34/443 |
| 3,987,148 A * | 10/1976 | Squires | ................... | 423/243.08 |
| 4,004,350 A * | 1/1977 | Squires | ................... | 34/506 |
| 4,004,897 A * | 1/1977 | Squires | ................... | 95/276 |
| 4,006,533 A * | 2/1977 | Squires | ................... | 34/498 |
| 4,353,722 A * | 10/1982 | Berz | ................... | 55/294 |
| 4,880,608 A * | 11/1989 | Stelman | ................... | 423/244.01 |
| 5,048,568 A * | 9/1991 | Moody | ................... | 137/625.28 |
| 5,401,285 A * | 3/1995 | Gillingham et al. | ................... | 55/284 |
| 6,302,931 B1 * | 10/2001 | Min | ................... | 55/283 |
| 6,309,447 B1 * | 10/2001 | Felix | ................... | 95/280 |
| 6,605,139 B2 * | 8/2003 | Felix | ................... | 95/280 |
| 6,783,326 B2 | 8/2004 | Weitkamp et al. | | |
| 6,783,572 B1 * | 8/2004 | Squires | ................... | 95/274 |
| 7,033,556 B1 * | 4/2006 | Squires | ................... | 423/215.5 |
| 7,309,379 B2 * | 12/2007 | Dai et al. | ................... | 95/110 |
| 7,815,717 B1 * | 10/2010 | Squires | ................... | 95/108 |
| 2011/0113736 A1 * | 5/2011 | Raether et al. | ................... | 55/302 |

OTHER PUBLICATIONS

Radosz et al.; Flue-Gas Carbon Capture on Carbonaceous Sorbenis: Toward a Low-Cost Multifunctional Carbon Filter for "Green" Energy Producers; Ind. Eng. Chem Res., (2008), vol. 47, p. 3783-3794.

A.M. Squires; Granular-bed filtration assisted by filter-cake formation: 4. Advanced designs for panel-bed filtration and gas treating; Powder Technology; vol. 55 (2005), p. 74-84.

\* cited by examiner

*Primary Examiner* — Robert Clemente
(74) *Attorney, Agent, or Firm* — James Creighton Wray

(57) ABSTRACT

There is provided method and apparatus for creating a longitudinally disposed, sharp puff of gas, useful for puffback renewal of gas-entry faces of a panel-bed gas filter or a panel-bed gas-powder contactor. Perforations are disposed along the wall of a tank in a path generally parallel to the tank's axis. Stoppers are provided for stoppering the perforations. With the perforations so stoppered, a gas is introduced at high pressure into the tank. Thereafter, quickly unstoppering the perforations releases the gas from the tank in form of a longitudinally disposed, sharp puff of gas moving in a direction perpendicular to the tank's axis. If the tank is placed vertically alongside or within a space receiving gas from a panel bed, the sharp puff can effectively puffback the panel bed.

8 Claims, 4 Drawing Sheets

METHOD AND APPARATUS FOR LONGITUDINALLY DISPOSED, SHARP PUFF OF GAS

This application claims the benefit of priority of U.S. Provisional Application having Ser. No. 61/215,075 filed May 1, 2009, which is herein incorporated by reference in its entirety.

FIELD OF THE INVENTION

The invention relates to the renewal of gas-entry faces in a panel bed of a loose granular solid material employed for intimate contacting of gas and the solid material for purpose of chemically or physically treating the gas or the granular solid (or both of these), for example: to filter fine particulate matter ("dust") from the gas; to effect a chemical change in gas or solid; to remove a chemical constituent of the gas by absorption, adsorption, or chemical reaction; to heat a cold gas by contact with a hot solid; to heat a solid by contact with a hot gas. Renewal of gas-entry faces is accomplished by employment of puffback: i.e., by subjecting the bed to a sharp puff of a gas in a direction reverse to the "forward" flow of the gas that earlier entered the bed for treatment.

BACKGROUND OF THE INVENTION

U.S. Pat. No. 6,783,527 (Aug. 31, 2004), which the instant application incorporates by reference, broadly discusses two significant uses of a panel of granular material: (1) for filtering a dusty gas, the filtration being assisted by an accumulation of dust deposits (filter cakes) upon gas-entry faces of the granular material; (2) for countercurrent contacting of the granular material with a gas. For gas filtration, U.S. Pat. No. 7,033,556 (Apr. 25, 2006), also incorporated herein by reference, discloses an improved arrangement (broadly speaking, a new kind of "panel bed") that employs vertically mounted filter trays for cleaning a dusty gas. See also "Granular-bed filtration assisted by filter-cake formation: 4. Advanced designs for panel-bed filtration and gas treating," by A. M. Squires, *Powder Technology*, vol. 155, pp. 74-84, 2005.

The referenced patents disclose means for renewing gas-entry faces of a panel bed of a granular material in which either filter trays or vertically disposed louvers (resembling slats of a Venetian blind) support the material. One means is to provide a "reverse" surge flow of gas toward the gas-entry faces (a "puffback"). This surge flow produces a body movement of the granular material toward the faces, spilling moieties of the material from the faces and concomitantly exposing previously underlying material, thereby renewing the faces. In experiments, at both the small and large scales, effecting the requisite reverse surge flow of gas has been accomplished by releasing gas from a tank holding gas at a pressure substantially higher than the panel bed's ambient pressure. Provided are a tank, a quick-opening valve for releasing the elevated-pressure gas therein, and duct work to carry the resultant surge flow of gas to the space that, in normal operation of the panel bed, receives treated gas; tank, valve, and duct work are external to this space.

SUMMARY OF THE INVENTION

Experience with installations of large, commercial-scale panel beds has disclosed disadvantages in this arrangement. Using commercially available "quick-opening" solenoid valves, delivery of a sufficiently sharp surge of gas through external duct work is difficult. For a new panel bed design (e.g., a significantly taller panel bed), expensive, large-scale testing has been required to ensure delivery of a sufficiently sharp surge, and, more particularly, to learn whether the action of puffback is sufficiently close to uniform along the height of the panel bed (i.e., that spills of granular material from its multiplicity of gas-entry faces are nearly equal in amount).

Accordingly, there is need for an improved means for supplying puffback gas to the tall, wide panel beds that are advantageously specified for use at a significant commercial scale.

A primary object of the invention is to provide improved, inexpensive method and apparatus for renewing gas-entry faces of a panel bed of granular material.

Another object is to provide puffback method and apparatus whereby a designer can specify both greater width and height than feasible hitherto in panel beds, i.e., beds of greater gas- or solid-treating capacity.

Another object is to eliminate ducts for carrying puffback gas to a space receiving gas from a panel bed during its normal treatment of "forwardly" flowing gas.

Another object is to provide puffback method and apparatus inherently guaranteeing substantially uniform spills of granular material from a multiplicity of gas-entry surfaces of a tall panel bed.

The present invention relates to a method for producing a longitudinally disposed, sharp puff of gas. A tank is provided with perforations disposed longitudinally along a path generally parallel to the tank's axis. The perforations are stoppered, substantially preventing passage of gas there through, and a gas is supplied to the tank at an elevated pressure. The perforations are quickly unstoppered, thereby suddenly releasing the gas in form of a longitudinally disposed, sharp puff moving in a direction perpendicular to the tank's axis.

The invention also relates to an apparatus for producing a longitudinally disposed, sharp puff of gas. The apparatus comprises a tank provided with perforations disposed longitudinally along a path generally parallel to the tank's axis; stoppers capable of a first movement into a set of positions whereby the perforations are stoppered, and the stoppers are also capable of a quick, second movement into a second set of positions whereby the perforations are unstoppered; a source of gas at elevated pressure; a connection between the source and the interior of the tank; and in the connection a valve the opening of which, when the stoppers are in the first set of positions, causes the tank to be filled with the gas at substantially the high pressure, so that the quick, second movement releases gas from the tank in a longitudinally disposed, sharp puff of gas moving in a direction perpendicular to the tank's axis.

Two quick-opening valves of the prior art should be mentioned as background for the instant invention. First, the Big Blaster Air Cannon (marketed by Martin Engineering Co., U.S. Route 34, Neponset, Ill. 61345) can provide a sudden release of gas from a chamber at high pressure. A piston separates a small zone and a large chamber, each at the high pressure; fast release of gas from the small zone causes the piston to move smartly into the zone, opening a port for sudden release of gas from the large chamber. Second, U.S. Pat. No. 5,048,568 (17 Sep. 1991) discloses a valve comprising two concentric, perforated, water-filled tubes. While the tubes' perforations are out of registry, an elevated pressure is imposed upon a zone of water that surrounds the tubes. A mechanical arrangement then moves one of the tubes in a motion that brings the tubes' perforations into registry, thereby producing a sharp inward pulse of water capable of launching a projectile from the inner tube. Neither of these prior-art valves is capable of creating the extended, longitudinally disposed, sharp puff of gas provided by the instant invention.

Exploiting this extended, longitudinal disposition, the invention also relates to an improved method and apparatus for renewal of a plurality of faces across which gas enters a panel bed of granular solid material provided for contacting the gas and the granular material with each other. First, "forward" flow of gas that undergoes contacting is interrupted. Next, the sharp puff flow of gas created by the instant invention is directed, without using a duct to carry the flow, into a space that previously received contacted gas from the panel. The sharp puff flow then creates a "puffback" of the granular material, which causes the material to move bodily toward the faces, thereby causing moieties of granular material to fall away from the faces with concomitant exposure of previously underlying granular material, renewing the faces.

In designs of commercial-scale panel beds studied hitherto, two panel beds are assembled in a module in which they face "outward": i.e., they receive forwardly flowing gas to be contacted from a space external to the module; contacted gas, exiting the two panel beds, enters an interior space bounded by the two beds and two side closures. The interior space can be said to be "vertical": advantageously, its height is considerably greater than the width dimension separating the interiorly-facing sides of the two panel beds.

An attractive arrangement, permitting a designer to specify a panel-bed module much taller than any considered hitherto, is to place the tank of the instant invention vertically alongside the vertical interior space. A preferred pattern for the tank's perforations is a series of holes equally spaced from one another and disposed along a line parallel to the tank's axis, their orientation being such that, when unstoppered, they direct a sharp puff of gas moving horizontally into the vertical interior space along this space's entire height. Inherently, with this arrangement, the action of puffback creates substantially uniform spills from the multiplicity of gas-entry faces of the module's two panel beds.

A panel-bed module design, however, may employ more than two beds, these cooperatively enclosing an interior space that receives contacted gas. For example, four panel beds could be arranged to enclose a vertical square space; six beds, a vertical hexagonal space; etc. In such designs, the tank, positioned vertically, could occupy a central location within the interior space; and cylinder perforations could advantageously be disposed in a spiral pattern (or in a pattern of other, more complex form).

In laboratory-scale experiments employing a small panel bed for gas filtration, puffback has been effected by opening a relatively small solenoid valve, releasing gas from a small tank containing gas at elevated pressure, via relatively short pipe connections, into a space adjacent to the clean side of the panel bed (i.e., the space that normally receives filtered gas). The experiments disclosed desirable attributes of the puff of gas reaching a panel bed during successful puffback: preferably, pressure in the clean-side space rises sharply, achieving a peak in pressure within about 10 to 15 milliseconds (ms); then the pressure typically falls away more slowly, returning to a value close to normal after about 30 ms.

Later experience, using larger, conventional solenoid valves and the necessarily longer pipe connections delivering puffback gas to the clean-side space behind a large panel bed, has proved disappointing. The opening speeds of such valves are slower than is desirable. These slow speeds, together with delays the longer pipes tend to create, extend the time for achieving a peak in pressure, typically, to 30 ms; and the pressure fall-away extends to 50 ms or longer.

Method and apparatus of the instant invention can achieve a time profile of pressure rise and fall resembling (or even improving upon) profiles seen in laboratory-scale experiments.

This and further other objects and features of the invention are apparent in the disclosure, which includes the above and ongoing written specification, with the claims and the drawings, and U.S. Pat. No. 6,783,527 and U.S. Pat. No. 7,033,556, incorporated by reference in their entireties in the instant application.

BRIEF DESCRIPTION OF THE DRAWINGS

The invention will be more particularly described in conjunction with the following drawings wherein.

DETAILED DESCRIPTION OF THE PREFERRED EMBODIMENTS

Figure 1:
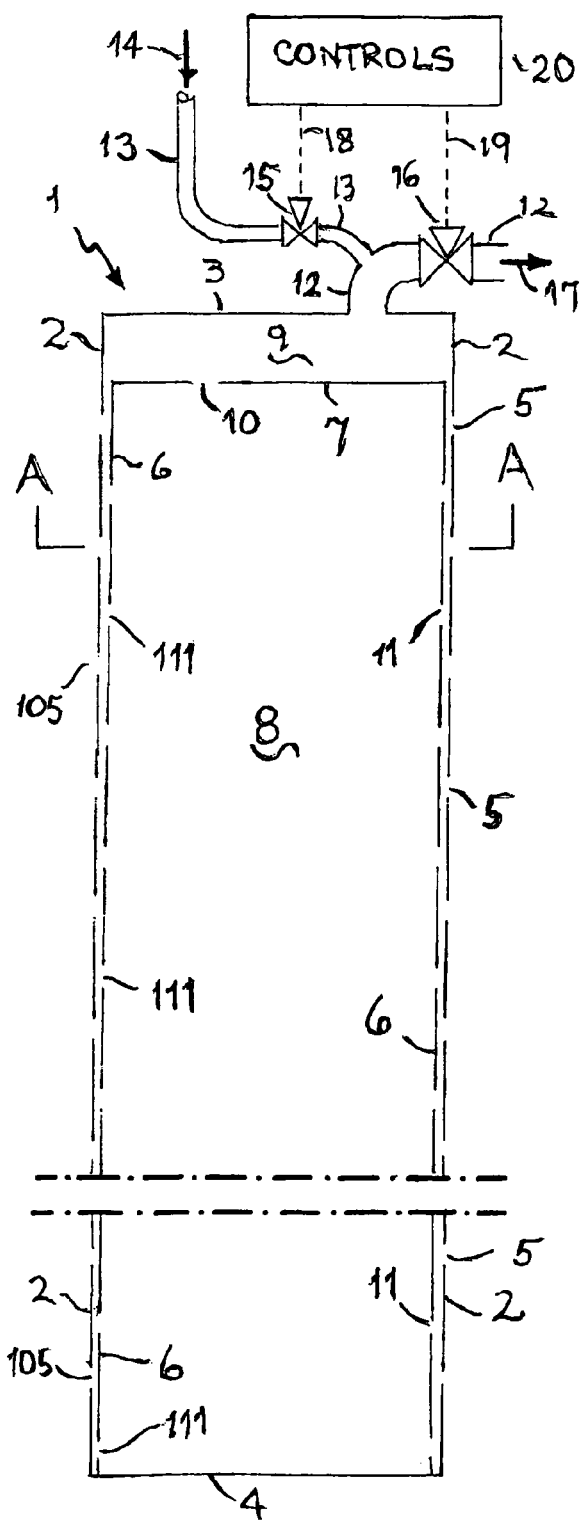
FIG. 1 illustrates a mechanical arrangement suitable for practice of the invention.

In all the figures, like reference numerals refer to like parts having like functions.

FIG. 1 illustrates, in cross-section, an arrangement suitable for stoppering and unstoppering perforations disposed longitudinally along the side of a tank. Tank 1 comprises relatively long cylinder 2 and end plates 3 and 4. In cylinder 2, equally spaced perforations 5 are disposed along a straight line substantially parallel to the cylinder's axis. Fitting snugly within cylinder 2, cylinder 6 is slightly smaller in diameter than cylinder 2. Cooperatively, cylinder 6, plate 4, and plate 7 enclose space 8. Notice that cylinder 6 is open at the end opposite to plate 7. Cooperatively, plates 3 and 7 and a portion of cylinder 2 enclose space 9, which is much smaller than space 8. Hole 10 in plate 7 connects spaces 8 and 9. Perforations 11 in cylinder 6 are the same size as perforations 5 and are disposed at the same spacing and along the same straight line as perforations 5; as shown in FIG. 1, the two sets of perforations are out of registry, so that portions of cylinder 6 effectively act as stoppers of perforations 5. A longitudinal motion of cylinder 6 that brings plates 3 and 7 into contact and extinguishes space 9 will, however, bring perforations 5 and 11 into registry.

Pipe 12 enters tank 1 via an opening in end plate 3. Pipe 13 connects pipe 12 with source 14 of a gas at elevated pressure. Opening valve 15 allows gas at elevated pressure to flow into space 9. Because of the relatively small size of space 9, opening valve 15 causes pressure in this space to rise quickly. Thereafter, gas flowing from space 9 through hole 10 produces a corresponding rise in pressure in space 8. If, after the latter rise in pressure, valve 15 is closed and valve 16 is opened, connecting space 9 via pipe 12 with the outside ambient pressure, gas flows quickly from space 12 to the outside as indicated by arrow 17. This flow produces a sudden, sharp reduction in gas pressure in space 9, whereupon pressure of gas in space 8 drives cylinder 6 upward, bringing plate 7 against end plate 3. The upward motion of cylinder 6 brings perforations 11 and 5 into registry. The number of perforations and their size should be chosen such that the flow of gas from space 8 to the ambient produces a sharp, longitudinally disposed puff, directed away from tank 1 in a direction perpendicular to the axis of tank 1. Connections 18 and 19 permit controls 20 to govern opening or closing of valves 15 and 16 respectively.

Figure 2:
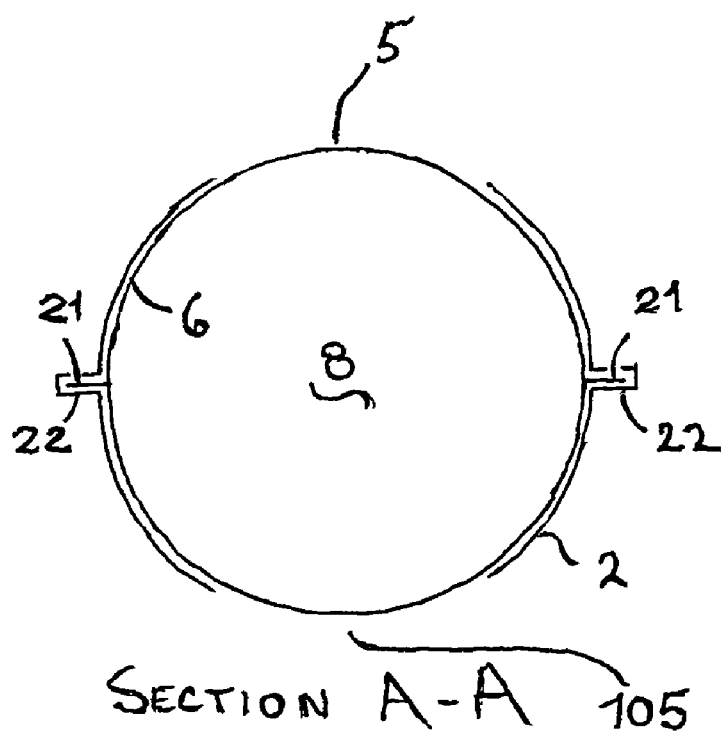
FIG. 2 is a section at A-A of FIG. 1.

The drawing in FIG. 2 illustrates Section A-A of FIG. 1, a cross-section perpendicular to the drawing of tank 1 in FIG. 1. Attached to cylinder 6 are vanes 21; these fit into guide pockets 22 attached to cylinder 2. The arrangement ensures that cylinder 6 does not rotate as it moves in response to the opening of valve 16.

Notice that the stoppering of perforations 5, as seen in the drawing in FIG. 1, need not be absolutely gas tight. A significant leakage of gas can be permitted from space 8 after gas pressure therein has risen to a level close to the pressure in space 9, if operation of the arrangement is such that time is short between the moment when gas pressure in space 8 becomes substantially steady and the moment when valve 16 is opened.

As will be described more fully below, the arrangement of FIG. 1 can be employed to subject a panel bed to puffback, or, preferably, two "back-to-back" panel beds that constitute a module, the gas-exit sides of these beds cooperating with end plates to enclose a space for receiving exit gas. During normal operation of the panel-bed module (treating a gas, or a granulated solid material, or both of these), valves 15 and 16 are closed. When controls 20 sense that puffback will soon be required, these direct valve 15 to open. If tank 1 is disposed vertically, gravity may have already caused cylinder 6 to drop into the position seen in FIG. 1. If not, a sharp rise in gas pressure in space 9 drives plate 7 away from plate 3, creating space 9. When controls 20 sense that the space 8 pressure is approaching a stable value, these direct valve 15 to close and valve 16 to open, creating the sharp puff of gas required for an effective puffback.

In FIG. 1, elements 105 and 111 are optional; they function as already described for elements 5 and 11. Presence of the optional elements allows the arrangement of FIG. 1 to puffback two panel beds that constitute a panel-bed module (as will be described more fully below).

Figure 3:
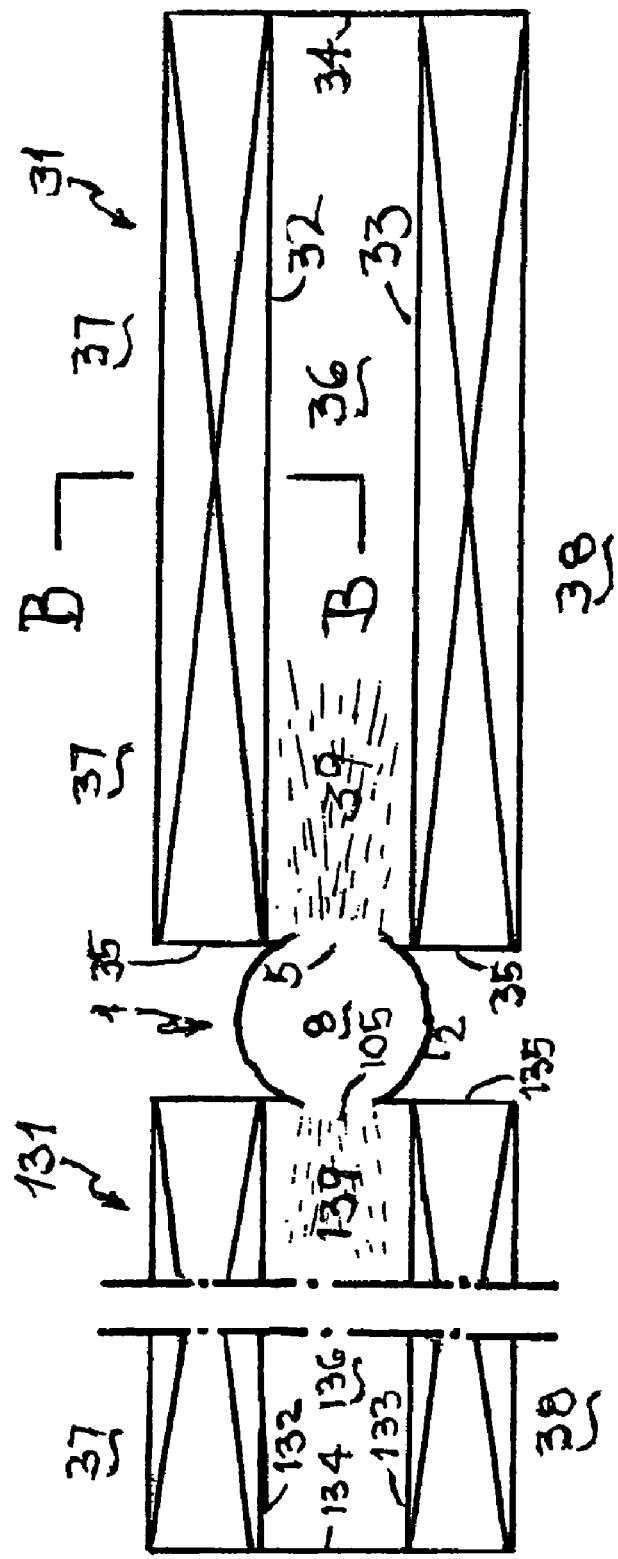
FIG. 3 illustrates use of the arrangement of FIG. 1 to accomplish the puffback of two panel-bed modules, each comprising two outwardly facing panel beds.

In a schematic, horizontal cross-section drawing, the drawing in FIG. 3 illustrates use of the arrangement depicted in FIG. 1 (including optional elements 105 and 111) to accomplish the simultaneous puffback of panel-bed modules 31 and 131. Each module comprises two outwardly facing panel beds (32 and 33 in 31; 132 and 133 in 131). In normal operation of the two panel bed modules, beds 32 and 132 receive gas for contacting from external space 37; beds 33 and 133 receive gas from space 38. Beds 32 and 33 discharge gas into space 36, enclosed within the gas-exit sides of beds 32 and 33 and end plates 34 and 35. Beds 132 and 133 discharge gas into space 136, enclosed within the gas-exit sides of beds 132 and 133 and end plates 134 and 135. To accomplish puffback of the two modules, longitudinally disposed, sharp puffs of gas 39 and 139 from perforations 5 and 105 enter spaces 36 and 136 respectively.

Figure 4A:
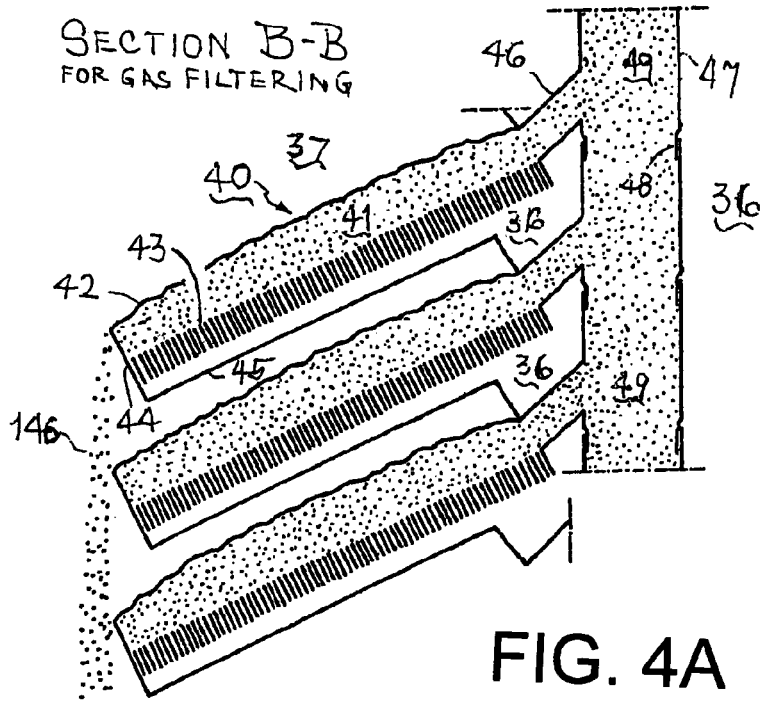
FIGS. 4A and 4B are sections at B-B of FIG. 3.
Figure 4B:
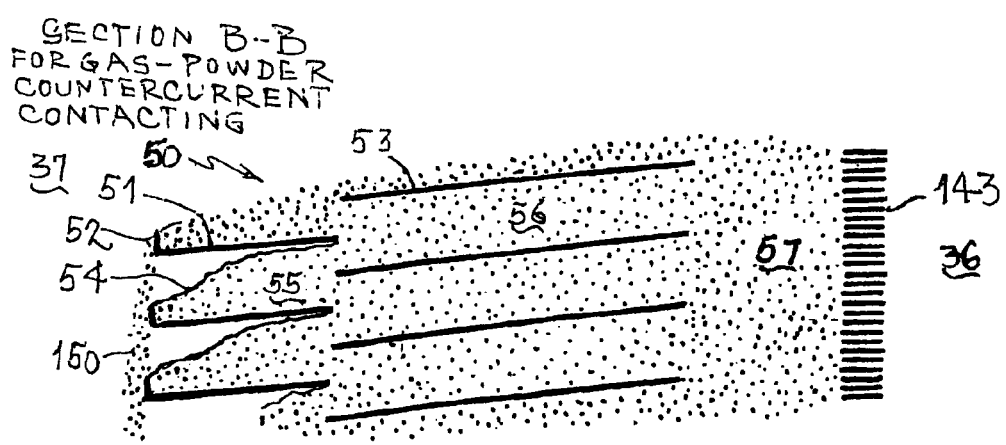

The two drawings FIGS. 4A and 4B of Section B-B in FIG. 3 partially illustrate two alternative vertical cross-sectional designs of panel bed 32, each at the moment of puffback. Each drawing displays how action of puffback creates a body movement of granular material toward the panel bed's gas-entry surfaces, causing granular bed spills 140 and 150 to fall away from the outer edges of supporting plates in the upper and lower B-B drawings FIGS. 4A and 4B, respectively.

The upper B-B drawing illustrates a preferred panel bed arrangement 40 for filtering dust from a "dirty" gas, the filtration being assisted by accumulation of filter cakes resting upon downwardly sloping gas-entry surfaces 42. See the aforementioned U.S. Pat. No. 7,033,556 (Apr. 25, 2006) for a more particular description of panel bed arrangement 40. Element 43, comprising narrowly spaced louvers, and plate 44 support bed 41 of granular material, the bed presenting gas-entry surface 42. In normal operation of panel bed 40, gas enters bed 41 from external space 37; flows generally downward across bed 41; exits the bed across element 43, entering internal space 36. At the moment of puffback, spill 140 of granular material and accumulated filter cake falls into external space 37 across the top edge of plate 44. Fresh granular material (making good loss of material in spill 140) enters bed 41 via duct 46 from space 49, a vertical column of the material held within a vertical pipe element 47. Elements 47 are stacked vertically, forming a continuous vertical pipe, a crimped portion 48 at the bottom of each element 47 fitting into the top of the subjacent element 47. A multiplicity of vertical pipe elements 47 are spaced apart and occupy a vertical plane perpendicular to the upper B-B drawing in FIG. 2. Notice that space 36 (as seen in the drawing beneath element 43 and above plate 45) is continuous with space 36 (as seen in the drawing to the right of pipe elements 47); i.e., gas emerging from element 43 flows through vertical openings between the adjacent pipe elements 47, which are spaced apart in a direction perpendicular to the drawing.

A lower B-B drawing FIG. 4B shows a preferred panel bed arrangement 50 for countercurrent contacting of a gas and a granular solid material. In normal operation of panel bed 50, gas enters the panel bed from external space 37 across gas-entry surfaces 54, moving into beds 55 of the material. A downwardly sloping flat-plate louver 51 and a plate 52 support each bed 55. Gas moves from bed 55 into bed 56, supported by flat-plate louver 53, which is offset vertically from louvers 51. From bed 56, gas flows across a vertical column 57 of the material, held in place between back edge of plates 53 and vertical element 143, comprising narrowly spaced, horizontal louvers. Gas moves across element 143 and enters internal space 36. At the moment of puffback, a mass movement of granular material occurs in beds 55 and 56, creating spill 150 of the material from the edge of plate 52. Fresh granular material (making good the loss in spill 150) enters bed 56 from material column 57. Puffback's intermittent renewal of a portion of the material in bed 56, together with the flow of gas in normal operation, achieves a countercurrent contacting of the gas and the material in bed 56. See the aforementioned U.S. Pat. No. 6,783,326 (Aug. 31, 2004) and the cited *Powder Technology paper* by A. M. Squires for a more particular description of the nature of the countercurrent contacting provided by panel bed 50.

An example of the application of the arrangement of the lower B-B drawing in FIG. 4B is for service bringing gaseous products of combustion of coal into countercurrent contacting with granules of activated carbon, thereby removing carbon dioxide, mercury, nitrogen and sulfur oxides, organic substances, and other contaminants. See M. Radosz, X. Hu, K. Krutkramelis, & Y. Shen, *Industrial & Engineering Chemistry Research*, vol. 47 (2008), pp. 3783-3794. For the coal-fired Wyodak station in Wyoming, these authors describe a set-up for contacting stack gas with carbon. (The station generates electricity at a rate of 335 MW.) Tentatively, the authors propose an arrangement comprising 189 vessels containing carbon, each 3.5 m in diameter and 2 m tall, the vessels alternating in three cycles: absorption at 25° C., desorption at 100° C., and cooling. Aside from absence of need for expensive valves and piping to support the cycling of three sets of vessels over time, other advantages of the lower B-B panel-bed arrangement in FIG. 4B are apparent from this invention. Three panel-bed modules, each for one of the three cycling functions, could be mounted vertically. For an absorption panel-bed module (working at 25° C.), each of its two panel beds are suitably 0.305 m across (the distance from outer edges of plates 52 to inner edges of louvers 143), 6 m tall, and 2.73 m wide (the distance between closure plates 33 and 34). Servicing two modules of this design (four panel beds), tank 1 is suitably 35 cm in diameter and 6 m tall; perforations 5 or 105 are suitably 100 in number, spaced at 6 cm apart, each 1.5 cm wide in a direction parallel to tank 1's axis, and extending through 23° of the tank's circumference. Gas pressure in space 8 is suitably about 300 kPa just before the moment of puffback. If one specifies the superficial gas velocity through countercurrent contacting zone 56 at 0.88 m/s (the velocity that the aforementioned authors, Radosz et al., specified in their proposed design for the Wyodak station), 36 panel beds (arranged in 18 modules serviced by 9 puffback tanks) can deal with stack gas from this station. If one specifies 9 m/s as the maximum vertical gas velocity in spaces 36, 136, 37, and 38, the array of 18 panel-bed modules has a footprint of 160 m². The footprint of the Radosz et al. design (if their vessels are placed in a square array on 5 m centers) is 3,900 m² (0.97 of an acre). Carbon inventory of the panel-bed array is about one-sixth that required by the Radosz et al. design. If one specifies the same carbon granule size as that which Radosz et al. contemplate using, the stack gas pressure drop for the panel-bed design is 15% of that for the Radosz et al. design.

For either design, the Wyodak station's stack gas must be scrupulously cleaned of coal ash dust before the $CO_2$ absorption step. For a filtration panel bed of the upper B-B design in FIG. 4A, a suitable projected, straight-line length of gas-entry surface 42 is 15 cm, a suitable height of panel bed 40 is 6 m, and a suitable width (distance between closure plates 34 and 35) is 2.56 m. Servicing two modules of this design (four panel beds), tank 1 is suitably 78 cm in diameter and 6 m tall; perforations 5 and 105 are suitably 100 in number, spaced at 6 cm apart, 1.5 cm wide in a direction parallel to tank 1's axis, and extending through 31° of the tank's circumference. Gas pressure in space 8 is suitably about 300 kPa just before the moment of puffback. At a gas-entry velocity of 0.2 m/s across gas-entry surfaces 42, 12 panel beds (6 modules serviced by 3 tanks) can filter stack gas from the Wyodak station at a high efficiency of dust collection. If one specifies 9 m/s as the maximum vertical velocity in spaces 36, 136, 37, and 38, the array of 6 panel-bed modules has a footprint of 27 m², far less than the footprint for either an electrostatic precipitator or a fabric filter affording comparable dust-collection efficiency.

While the invention has been described with reference to specific embodiments, modifications and variations of the invention may be constructed without departing from the scope of the invention, which is defined in the following claims.

I claim:

1. A method for producing a longitudinally disposed, sharp puff of gas comprising:
   providing a tank with a wall,
   providing a granular solid bed,
   providing gas entry faces in the bed,
   providing gas entry faces in the granular solid bed for forward flow of gas through the faces,
   disposing perforations in said wall longitudinally along a path generally parallel to an axis of said tank;
   stoppering said perforations;
   introducing gas at elevated pressure in said tank;
   quickly unstoppering said perforations, thereby releasing said gas from said tank in form of a longitudinally disposed, sharp puff of gas moving in a direction perpendicular to said axis of said tank.

2. The method of claim 1, wherein said path is substantially a straight line.

3. A method for producing a longitudinally disposed, sharp puff of gas comprising:
   providing a tank with a wall,
   disposing perforations in said wall longitudinally along a path generally parallel to an axis of said tank;
   stoppering said perforations;
   introducing gas at elevated pressure in said tank;
   quickly unstoppering said perforations, thereby releasing said gas from said tank in form of a longitudinally disposed, sharp puff of gas moving in a direction perpendicular to said axis of said tank,
   wherein said tank is a first cylinder with a first set of perforations disposed along a first path;
   said stoppering comprises placing a second cylinder fitting snugly within said first cylinder, an axis of said second cylinder being identical with the axis of said first cylinder;
   and further comprising in a wall of said second cylinder, disposing a second set of perforations longitudinally along a second path, identical to said first path, yet also disposing said second set of perforations such as not to be in registry with said first set of perforations;
   after introducing gas at elevated pressures in said first tank, quickly moving said second cylinder and allowing the two sets of perforations to come into registry, thereby unstoppering said first set of perforations.

4. A method for producing a longitudinally disposed, sharp puff of gas comprising:
   providing a tank with a wall,
   disposing perforations in said wall longitudinally along a path generally parallel to an axis of said tank;
   stoppering said perforations;
   introducing gas at elevated pressure in said tank;
   quickly unstoppering said perforations, thereby releasing said gas from said tank in form of a longitudinally disposed, sharp puff of gas moving in a direction perpendicular to said axis of said tank,
   wherein said longitudinally disposed, sharp puff effects the puffback of a panel bed of granular solid material employed for gas filtering or gas-powder contacting.

5. A method for effecting puffback of a panel bed of granular solid material employed for gas filtering or gas-powder contacting through action of a longitudinally disposed, sharp puff of gas, comprising:
   placing a vertical tank within or alongside a space receiving treated gas from a gas-exit side of said panel bed, a height of said tank being substantially identical to a height of said space;
   in said tank, disposing perforations longitudinally along a path generally parallel to an axis of said tank;
   stoppering said perforations;
   introducing gas at elevated pressure in said tank;
   quickly unstoppering said perforations, thereby releasing said gas in form of a longitudinally disposed, sharp puff of gas moving into said space, thereby effecting the pullback of said panel bed.

6. The method of claim 5, wherein
   placing said tank comprises placing a first cylinder with a first set of perforations disposed along a first path; and wherein
   said stoppering comprises placing a second cylinder fitting snugly within said first cylinder, an axis of said second cylinder being identical with the axis of said first cylinder; and further comprising in a wall of said second cylinder, disposing a second set of perforations longitudinally along a second path, identical to said first path, yet also disposing said second set of perforations such as not to be in registry with said first set of perforations;

after introducing gas at elevated pressure in said first tank, quickly moving said second cylinder and allowing the two sets of perforations to come into registry, thereby unstoppering said first set of perforations.

7. An apparatus for producing a longitudinally disposed, sharp puff of gas comprising:
   a tank having perforations disposed longitudinally along a path generally parallel to an axis of said tank;
   providing a granular solid bed,
   Providing gas entry faces in the bed,
   providing gas entry faces in the solid bed for forward flow of gas through the faces,
   stoppers movable in a first movement into a first set of positions whereby said perforations are stoppered and also movable in a quick second movement into a second set of positions whereby said perforations are unstoppered;
   a source of gas at elevated pressure, a connection between said source and an interior of said tank, and in said connection a valve having an opening which, when said stoppers are in said first set of positions, causes said tank to be filled with said gas at elevated pressure, so that said quick second movement releases said gas from said tank in form of a longitudinally disposed, sharp puff of gas in a direction perpendicular to said axis of said tank.

8. An apparatus for producing a longitudinally disposed, sharp puff of gas comprising:
   a tank having perforations disposed longitudinally along a path generally parallel to an axis of said tank;
   stoppers movable in a first movement into a first set of positions whereby said perforations are stoppered and also movable in a quick second movement into a second set of positions whereby said perforations are unstoppered;
   a source of gas at elevated pressure, a connection between said source and an interior of said tank, and in said connection a valve having an opening which, when said stoppers are in said first set of positions, causes said tank to be filled with said gas at elevated pressure, so that said quick second movement releases said gas from said tank in form of a longitudinally disposed, sharp puff of gas in a direction perpendicular to said axis of said tank,
   wherein said tank comprises a first cylinder with a first set of perforations disposed along a first path;
   said stoppers comprise a second cylinder fitting snugly within said first cylinder, an axis of said second cylinder being identical with the axis of said first cylinder;
   in a wall of said second cylinder, a second set of perforations longitudinally along a second path, identical to said first path, said second set of perforations disposed to not be in registry with said first set of perforations;
   after introducing gas at elevated pressure in said first tank, said second cylinder being quickly movable allowing the two sets of perforations to come into registry, thereby unstoppering said first set of perforations.

* * * * *